Patented Apr. 18, 1939

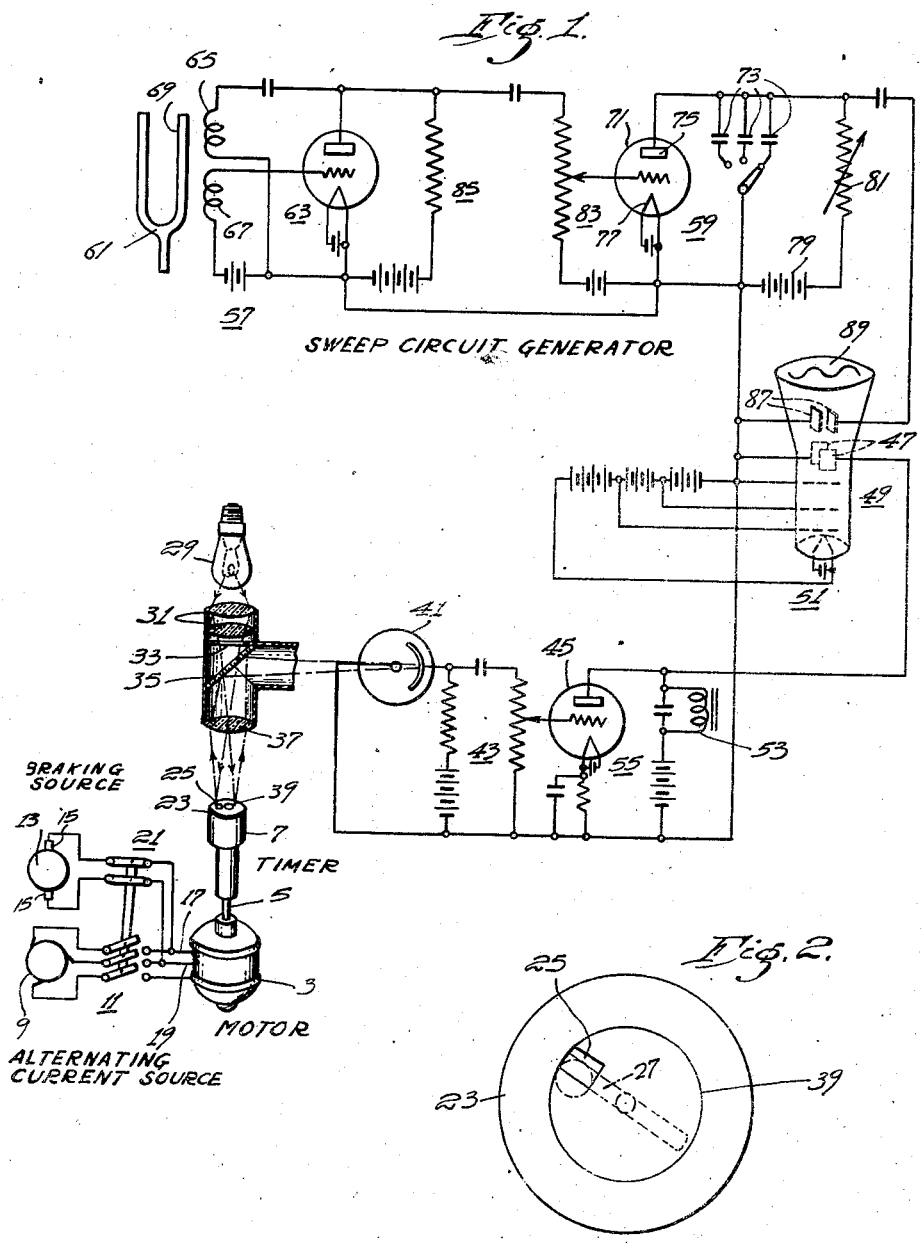

2,155,280

UNITED STATES PATENT OFFICE 2,155,280

ELECTRIC DISCHARGE APPARATUS

Stanley J. Mikina, Wilkinsburg, Kirk A. Oplinger, Verona, William O. Osbon, Swissvale, and Stephen Sentipal, East McKeesport, Pa., assignors to Westinghouse Electric & Manufacturing Company, East Pittsburgh, Pa., a corporation of Pennsylvania Application May 3, 1938, Serial No. 205,868

12 Claims. (Cl. 172—245)

Our invention relates to electric discharge apparatus, and has particular relation to apparatus for indicating and measuring the frequency of a timer.

The invention is an outgrowth of our work in developing apparatus for calibrating timers of the type used particularly in connection with rotating bodies. The timer is mounted on the body and functions to cause a mechanism on the body to operate at a proper instant. The specific structure of the contrivance does not concern the present invention and, therefore, need not be described in detail here. Suffice it to say that the mechanism is of the usual clockwork type having an escapement which rocks when the device is in operation. It may be wound up and set manually but has an automatic starting device which functions in response to the centrifugal force produced by the rotation of the body to initiate the timing. Bodies of the type involved here are given a high rotational speed of the order of 16,000 rotations per minute. This speed is so high that the centrifugal force produced thereby in addition to initiating the timing affects the operation of the timer mechanism.

By reason of the disturbing forces produced by the rotation of the timer when it is in actual use, the calibration of the timer is not a simple matter. Since the speed of rotation affects the operation of the timer, the calibration cannot be carried out by simply comparing the frequency of vibration of the timer with a standard when the timer is at rest. On the other hand, determination of the frequency of the timer with the timer in motion involves the problem of observing the movement of one of the moving parts of the timer (as for example the escapement) while the timer is in motion.

It is an object of our invention to provide an arrangement for accurately calibrating a timer on a body which rotates at a speed so high that the operation of the timer is effected.

A more general object of our invention is to provide an apparatus for measuring the frequency of operation of a timing device which in actual use moves at such a speed that the operation of the mechanism is affected by the acceleration forces of the movement.

An ancillary object of our invention is to provide a simple and inexpensive system for calibrating a timer of any general type.

An additional object of our invention is to provide an optical system for observing the movement of a moving part of a timer which is itself moving at a high speed.

More specifically stated, it is an object of our invention to provide a system particularly adapted for use by unskilled persons for accurately calibrating a timer in the practice of which a cathode ray tube shall be used to indicate the results of the comparison with the standard.

According to our invention, the timer to be calibrated is rotated by a motor at the speed that it has while in actual use. For purposes of comparison the movement of the escapement of the timer is observed. A beam of radiant energy is projected on the timer so that it covers the various positions of the escapement as the timer is in motion. In the preferred practice of our invention, visible light is used but infra-red or ultra-violet light may also be used if any necessity therefor arises. The escapement lever as it vibrates varies the light reflected by the surface of the timer below it and the reflected ray thus varies in accordance with its movement. The variations in the light are converted into electrical pulsations by a photo-electric cell and the output of the cell is used to supply the signal frequency of a cathode ray tube. The sweep frequency of the cathode ray tube is synchronized at a sub-multiple of the desired frequency of the timer.

When both the sweep frequency and the signal frequency are applied to the cathode ray tube, a wave is produced on its screen from which the operator determines what adjustments to make in the timer. If the wave is at rest, no further adjustment is necessary in the timer mechanism. If the wave is moving in one direction the frequency is too high and if it is moving in the other direction it is too low. In either case the operator quickly stops the rotation of the timer and makes the necessary adjustment. The adjustment is repeated until the wave on the screen of the cathode ray tube is at rest. After he has gained experience in making observations and adjustments, an operator can determine the extent of the necessary adjustment by the speed of movement of the cathode ray tube wave so that very few adjustments suffice to put the timer in proper condition for operation.

The novel features that we consider characteristic of our invention are set forth with particularity in the appended claims. The invention itself, however, both as to its organization and its means of operation, together with additional objects and advantages thereof, will best be understood from the following description of a specific embodiment when read in connection with the accompanying drawing, in which:

Figure 1 is a diagrammatic view showing an embodiment of our invention; and

Fig. 2 is an enlarged view in top elevation of a timer arranged for a calibrating operation.

The apparatus shown in the drawing comprises a motor 3 on the shaft 5 of which a timer 7 to be calibrated is mounted. The motor is of the induction high speed type described specifically in a copending application, Serial No. 31,074 for High speed electric motor assemblies, filed July 12, 1935, of John G. Baker, Frank C. Rushing, Stanley J. Mikina and Harry D. Else, and assigned to Westinghouse Electric & Manufacturing Company. The motor 3 is designed to operate from a supply having a frequency of the order of 200 to 300 cycles. In the practice of our invention, it is supplied from a three-phase alternating current source 9 of suitable frequency through a manually operable switch 11. The motor may, of course, be energized in any convenient manner. However, where commercial power is available, we prefer to use a motor-generator set, the frequency of which is adjustable over the range necessary to attain the desired speed of rotation.

It is desired that during the operation of the apparatus, the motor 3 be stopped very quickly to make adjustments before a timer which has been wound up for testing runs down. To attain this desideratum a direct-current braking source 13 is provided. The terminals 15 of the source 13 are connected to two of the terminals 17 and 19 of the motor 3 through another switch 21 which is connected to operate positively with the switch 11 through which the motor is energized. When the motor supply 9 is disconnected from the motor, the direct-current supply 13 is connected to the motor and vice versa. In the former case the motor is brought to rest in a very short time even though it has been rotating at full speed when the supply circuit was opened and the braking circuit closed. In the latter case the motor is quickly brought from rest to full speed.

The upper surface of the timer 7, mounted on the motor shaft 5, is covered by a black mask 23 provided with a rectangular opening 25 at the position just above the escapement lever 27 of the timer. The escapement lever 27, as it rocks, moves in and out of the rectangular opening 25, presenting its surface at a frequency equal to that at which it vibrates.

To observe the motion of the lever 27, a beam of radiant energy is projected onto the surface of the mask 23. The radiations are provided by a suitable luminous source such as a lamp 29 having a relatively small filament. The lamp is disposed directly above the surface of the mask and its radiations are projected through a suitable condensing lens 31 and illuminate an aperture 33. The radiations then pass through a transparent plate 35, preferably of glass, disposed at 45° to the axis of the beam, and are gathered by an objective lens 37 which focuses the aperture 33 on the surface of the mask 23. It is preferred that the condensing lens 31 be of such dimensions and be so disposed relative to the source 29 that the filament of the source is focused at the center of the objective lens 37.

The aperture 33 has a circular opening which is of such dimensions that its image on the mask is a circle 39 covering at least the area of the circle which just encloses the rectangular opening 25 over its whole path. The rectangular opening 25 is thus illuminated by the source 29 in every position which it assumes as the timer 7 is rotated.

When both the motor 3 and the timer 7 are in operation, the timer and the mask 23 rotate and the escapement lever 27 rocks in and out of the rectangular opening 25, varying the intensity of the light reflected by the surface of the timer under it. In this manner a series of light impulses having a period corresponding to that of the lever are produced. The reflected light impulses pass through the objective lens 37 and are projected onto the 45° plate 35. The impulses are then reflected by the surface of the plate 35 in a direction at right angles to the incident direction.

We have found that an ordinary glass plate having a thickness of the order of $\frac{1}{16}$ inch has the property of reflecting the light projected thereon in the manner described hereinabove. However, if a greater intensity of reflected light is desired than would be obtained from a completely transparent plate, the surface of the plate which is to reflect, i. e., the surface forming the mask 23, may be covered by a thin layer of silver or gold. Such a contrivance is known in the art as a half-silvered mirror. Moreover, since the beam of light reflected from the escapement lever 27 covers a substantially greater area in impinging on the plate 35 than the beam of light incident on the lever in passing through the plate, an ordinary silvered mirror with the silver scraped out near the center may be used. The ray from the source 29 then passes through the scraped out opening in the center of the mirror and the ray reflected from the escapement lever is deflected by the remaining portion of the silver.

It is to be noted that in the arrangement just described we have provided a system for observing the movement of the escapement lever 27 which eliminates any variations arising from the movement of the timer 7. In the arrangement the center of the beam of light incident on the mask surface is projected normally to the surface of the timer 7 and is, therefore, at all times normal to the reflecting surface of the escapement lever 27. If the incident light were projected at an angle to the surface of the timer, considerable variation in the intensity of the reflected light would result from the different angles which the incident beam would have as a result of the different positions assumed by the escapement lever in its rotation with the timer 7.

The light pulsations reflected by the escapement lever 27 and the plate 35 are focused by the objective lens 37 on a photo-electric cell 41. The cell is connected in the input circuit 43 of a suitable amplifier tube 45, the output of which is impressed between the signal deflecting plates 47 of a suitable cathode ray oscillograph tube 49. All extraneous frequencies other than the frequency of the movement of the escapement lever are shunted out of the signal circuit 51 of the cathode ray tube 49 by a suitable filter 53 connected in the anode circuit 55 of the amplifier 45 in parallel with the signal plates 47. It is to be noted that while the cathode ray tube shown in Fig. 1 is provided with electrostatic signal plates, our invention may equally as well be practiced with a cathode ray tube in which the signal deflection takes place magnetically.

The cathode ray tube 49 is also supplied with a sweep circuit synchronized at a sub-multiple of the desired frequency of the timer 7. For this purpose a tuning fork oscillator 57 is connected in cooperative relationship with the saw-tooth oscillator 59 which provides the potential of sawtooth wave shape for causing the cathode ray beam to sweep across the screen at right angles to its movement under the influence of the signal potentials. The tuning fork oscillator comprises a tuning fork 61 and an oscillation generator 63. The oscillation generator is of the ordinary regenerative coupled type and its coupling coils 65 and 67 are magnetically linked with one prong 69 of the fork. The tuning fork 61 is selective to have a natural frequency which is equal to or a multiple of the frequency of the timers and the potential produced by the oscillator 63 is, therefore, of this frequency.

The saw tooth oscillator 59 comprises a grid controlled gaseous tube 71, the anode potential of which is supplied from a suitable capacitor 73 connected directly between the anode 75 and the cathode 77. The capacitor 73 is charged from a source 79, preferably of the direct current type, through a variable resistor 81. The central circuit 83 of the gaseous tube 71 is supplied from the output circuit 85 of the oscillation generator 57. The gaseous tube 71 thus becomes conductive when the potential supplied by the charged capacitor 73 is preferably related to the potential supplied by the tuning fork oscillator 57 and at this time the capacitor is discharged through the tube. By properly selecting the magnitudes of the capacitor 73 and the resistor 81, the periodicity of charge and discharge of the capacitor may be given any desired value. In the present case, the magnitudes are so selected that the period of the charge and discharge of the capacitor 73 is several times the period of the tuning fork. Where the tuning fork frequency is equal to the timer frequency, this factor is of the order of three or four. When this is the case, the potential provided across the capacitor 73 as it charges and discharges has a period of 3 or 4 times that of the tuning fork or of the timer. This periodic relationship is precise because the tuning fork maintains the synchronism. In the art, such a situation is described by saying that the saw-tooth oscillator 59 is locked into synchronism by the tuning fork oscillator 57.

The potential provided by the capacitor 73 in the anode cathode circuit of the gaseous tube 71 is impressed between the sweep circuit plates 87 (or on the sweep circuit coils) of the cathode ray tube 49 in the usual manner and the cathode ray beam produced in the tube, therefore, moves back and forth in one direction along the screen 89 at a frequency corresponding to the output of the sweep circuit. In the other direction the cathode ray beam is moved at a frequency corresponding to the signal potential provided through the photo-electric cell 41.

As has been explained, the tuning fork and the dimensions of the capacitor 73 and the resistor 81 are so related that the sweep circuit frequency is synchronized at a sub-multiple of the signal circuit frequency which would be produced for the desired movement of the escapement. Accordingly, if the escapement lever 27 is rocking at the desired frequency, the wave produced on the screen of the cathode ray tube will remain at rest. If the frequency of the escapement is too low the wave will move in one direction, and if the frequency is too high, the wave moves in the other direction. The deviation of the actual timer frequency from the desired timer frequency will determine the speed of this movement within limits. If the wave is moving, the operator after noting the direction and amount of movement of the wave, quickly opens the supply circuit from the alternating current generator 9 to the motor 3 and at the same time closes the circuit to the direct-current generator 13, immediately stopping the motor. After this he makes the necessary adjustment and repeats the above-described operation.

The apparatus described herein is to be taken as symbolic of the general apparatus which may be used for carrying out our invention. We have shown a number of specific electrical elements and specific circuits in which the elements are connected. It is apparent, of course, that our invention may be practiced with elements and circuits of other structures than those actually shown.

In an actual structure which we have found to operate in a highly propitious manner a timer having a desired frequency of 172 cycles per second was calibrated. In this system the source used is a Westinghouse type 1129 automobile spotlight lamp. The photo-electric cell is an RCA type 868 manufactured by the Radio Corporation of America. The output of the cell is amplified by an RCA type MI-4265 amplifier. The filter 53 consists of a pair of parallel resonant circuits coupled by a high resistor of the order of 250,000 ohms. The circuits resonate at a frequency of 172 cycles. The unit comprising the saw-tooth oscillator 59 and the cathode ray tube 51 is an RCA TMV-122-B cathode ray oscillograph. This oscillograph is the same as the arrangement shown in the drawing except that it includes an amplifier through which the signal plates are supplied from the signalling source. The tuning fork oscillator whereby the sweep circuit is synchronized is an RCA type GM-256-A1 tuning fork oscillator with a tuning fork having a frequency of 172 cycles.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. For use with an element in periodic motion, the combination comprising means for producing a beam of radiant energy, the intensity of which varies in rhythm with said periodic motion, photo-sensitive means responsive to said beam of radiant energy, means for indicating the periodicity of said moton responsive to said photo-sensitive means, said indicating means comprising an electron responsive screen, means for projecting a stream of electrons on said screen, means for deflecting said stream in one direction along said screen in accordance with the response of said photo-sensitive means and means for deflecting said stream in another direction along said screen with a fixed periodicity.

2. For use with an element in periodic motion, the combination comprising means for producing a beam of radiant energy, the intensity of which varies in rhythm with said periodic motion, photo-sensitive means responsive to said beam of radiant energy, means for indicating the periodicity of said motion, responsive to said photo-sensitive means, said indicating means comprising an electron responsive screen, means for projecting a stream of electrons on said screen, means for deflecting said stream in one direction along said screen in accordance with the response of said photo-sensitive means, and means for deflecting said stream in another direction along said screen at a frequency which is a sub-multiple of the frequency at which it is desired that said element move.

3. For use with an element in periodic motion, the combination comprising means for producing a physical disturbance the intensity of which varies in rhythm with said periodic motion, means responsive to said disturbance, means for indicating the periodicity of said motion responsive to said disturbance responsive means, said indicating means comprising an electron responsive screen, means for projecting a stream of electrons on said screen, means for deflecting said stream in one direction along said screen in accordance with the response of said disturbance responsive means, and means for deflecting said stream in another direction along said screen at a frequency which is a sub-multiple of the frequency at which it is desired that said element move.

4. For use in calibrating a timer having an escapement moving with the periodicity of said timer comprising means for producing a beam of radiant energy which varies in rhythm with the motion of said escapement, photo-sensitive means responsive to said beam of radiant energy, and comparison means responsive to said photo-sensitive means, said comparison means including a cathode ray tube having a sweep circuit frequency synchronized at a sub-multiple of the desired frequency of said timer and having its signal frequency supplied from said photo-sensitive means.

5. For use with an element in motion which is located in a body that is itself in motion, the combination comprising means for causing said element to emit a beam of radiant energy in the various positions that it assumes as said body moves, means for causing said beam to vary in accordance with the motion of said element and means responsive to said varying beam.

6. For use with an element in periodic motion which is located in a body that is itself in rotary motion, the combination comprising means for projecting a beam of radiant energy that covers at least the area over which said element is moved by the motion of said body, means for causing the resultant beam emitted by said element to vary in accordance with the motion of said element, and means responsive to said resultant beam.

7. Apparatus according to claim 6 in which the projected beam and the resultant beam are at least in part substantially parallel to each other but in opposite directions, and the resultant beam is directed to the responsive means by an optical element having the property both of transmitting and reflecting radiant energy through which the projected beam passes.

8. Apparatus according to claim 6 characterized by the fact that the body has a plane surface in which the element is located and the projected beam and the resultant beam are normal to the surface, the projected beam passing through an optical element which has the property of transmitting and reflecting radiant energy which reflects the resultant beam at right angles to its original direction of motion.

9. For use in calibrating a timer having an escapement in periodic motion, the said timer being itself rotated at a speed such that the movement of the escapement is materially affected by the rotation, the combination comprising means for projecting a beam of radiant energy that covers at least the area over which a moving part of said escapement is moved by the rotation of said timer, means for causing the resultant beam emitted by said part to vary with the motion of said escapement, and means for indicating the periodicity of the variation of said resultant beam responsive to said resultant beam.

10. For use in calibrating a timer having an escapement in periodic motion, the said timer when in operation being itself rotated at a speed such that the movement of the escapement is materially affected by the rotation, the combination comprising means for rotating said timer at substantially the same speed as it is rotated when in operation, means for projecting a beam of radiant energy that covers at least the area over which a moving part of said escapement is moved by the rotation of said timer, means for causing the resultant beam emitted by said part to vary with the motion of said escapement and means for indicating the periodicity of the variations of said resultant beam responsive to said resultant beam.

11. For use with an element in periodic motion which is located in a body that is itself in rotary motion, the combination comprising means for projecting a beam of radiant energy that covers at least the area over which said element is moved by the motion of said body, means for causing the resultant beam emitted by said element to vary in accordance with the motion of said element, and means responsive to said resultant beam, said responsive means comprising a cathode ray tube having a sweep frequency synchronized at a sub-multiple of the desired frequency of said element and having its signal frequency supplied by said resultant beam.

12. For use in calibrating a timer having an element moving with the periodicity of said timer comprising means for producing a beam of radiant energy which varies in rhythm with the motion of said element, photo-sensitive means responsive to said beam of radiant energy and comparison means responsive to said photo-sensitive means, said comparison means including a cathode ray tube having a sweep circuit frequency synchronized at a sub-multiple of the desired frequency of said timer.

STANLEY J. MIKINA.
KIRK A. OPLINGER.
WILLIAM O. OSBON.
STEPHEN SENTIPAL.